US011872900B2

(12) United States Patent
Tsuchiya

(10) Patent No.: US 11,872,900 B2
(45) Date of Patent: Jan. 16, 2024

(54) INFORMATION NOTIFICATION DEVICE, INFORMATION NOTIFICATION SYSTEM, INFORMATION NOTIFICATION METHOD, AND VEHICLE

(71) Applicant: Toyota Jidosha Kabushiki Kaisha, Toyota (JP)

(72) Inventor: Yoshiyuki Tsuchiya, Hamamatsu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 362 days.

(21) Appl. No.: 17/189,869

(22) Filed: Mar. 2, 2021

(65) Prior Publication Data

US 2021/0276439 A1 Sep. 9, 2021

(30) Foreign Application Priority Data

Mar. 6, 2020 (JP) .................. 2020-039163

(51) Int. Cl.
*B60L 53/30* (2019.01)
*B60L 53/62* (2019.01)
*H04W 4/12* (2009.01)
*H04W 88/02* (2009.01)

(52) U.S. Cl.
CPC ............ *B60L 53/305* (2019.02); *B60L 53/62* (2019.02); *H04W 4/12* (2013.01); *H04W 88/02* (2013.01)

(58) Field of Classification Search
CPC ................................ B60L 53/66; B60L 53/16
USPC ......................................... 320/134, 109, 152
See application file for complete search history.

(56) References Cited

U.S. PATENT DOCUMENTS

| 2015/0042286 | A1 | 2/2015 | Lu et al. |
| 2015/0378315 | A1 | 12/2015 | Takahashi |
| 2016/0303992 | A1* | 10/2016 | Lovett .................. B60W 20/13 |
| 2019/0061546 | A1* | 2/2019 | Miftakhov .............. H02J 3/322 |
| 2021/0213850 | A1* | 7/2021 | Carpenter .............. G07C 5/008 |

FOREIGN PATENT DOCUMENTS

| CN | 103186419 A | 7/2013 |
| CN | 103378622 A | 10/2013 |
| CN | 109450061 A | 3/2019 |
| CN | 110356266 A | 10/2019 |
| EP | 3403870 A1 | 11/2018 |
| EP | 3540901 A1 | 9/2019 |
| JP | 2014-161182 A | 9/2014 |
| JP | 2018-196248 A | 12/2018 |
| JP | 2018-207713 A | 12/2018 |

* cited by examiner

*Primary Examiner* — Kiet M Doan
(74) *Attorney, Agent, or Firm* — Dinsmore & Shohl LLP

(57) ABSTRACT

When a charging connector of an EVSE is connected to an inlet, a vehicle transmits charging information to a server. The server determines whether or not there is a predetermined function which is set to OFF among functions for external charging included in the vehicle. When there is a predetermined function which is set to OFF, the server transmits a recommendation notification to a smartphone. The smartphone transmits selection information in response to an operation of a user on the recommendation notification to the server. Based on the selection information, the server generates setting information about the predetermined function and transmits the setting information to the vehicle. The vehicle performs a setting for the predetermined function according to the setting information.

10 Claims, 10 Drawing Sheets

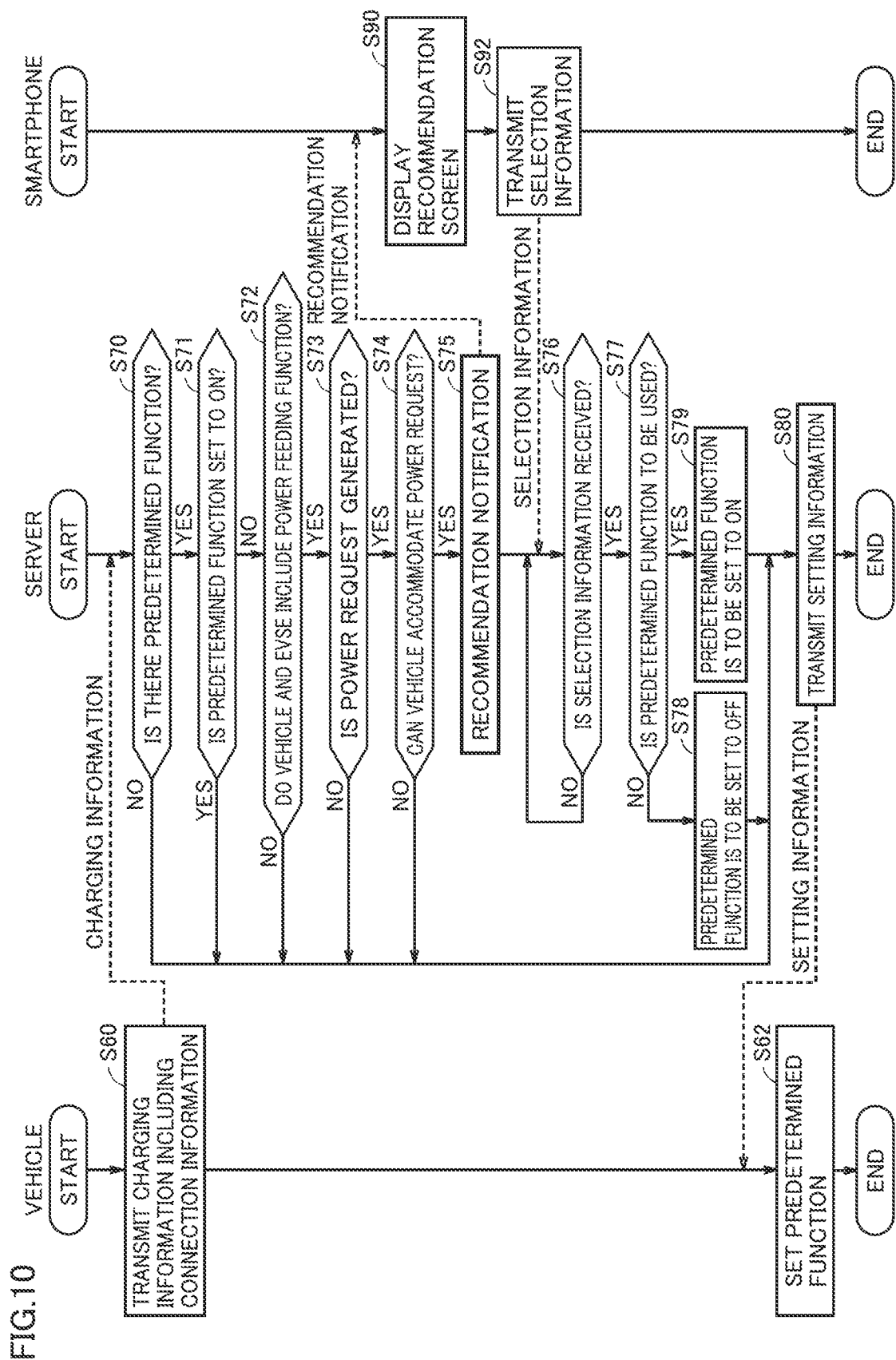

INFORMATION NOTIFICATION DEVICE, INFORMATION NOTIFICATION SYSTEM, INFORMATION NOTIFICATION METHOD, AND VEHICLE

CROSS REFERENCE TO RELATED APPLICATIONS

This nonprovisional application claims priority to Japanese Patent Application No. 2020-039163 filed on Mar. 6, 2020 with the Japan Patent Office, the entire contents of which are hereby incorporated by reference.

BACKGROUND

Field

The present disclosure relates to an information notification device, an information notification system, an information notification method, and a vehicle.

Description of the Background Art

In recent years, vehicles that enable external charging, which charges a power storage device mounted on a vehicle using power supplied from a power source external to the vehicle, have become increasingly popular. Some of such vehicles include various functions for the external charging.

For example, Japanese Patent Laying-Open No. 2018-196248 discloses a vehicle including a timer charging function. When a user uses the timer charging function in this vehicle, external charging is performed during a period from a start time to an end time set for the charging.

SUMMARY

Some vehicles include a timer charging function, a function of setting an upper limit power storage amount in external charging, and other various functions. However, there may be cases where a user of a vehicle does not know how to use various functions, or does not even know that the vehicle includes such functions.

Although it is possible to make a setting to use an arbitrary function included in a vehicle by default, such a setting may be inconvenient for a user who does not want to use the function, because the user has to cancel the function.

The present disclosure has been made to solve the aforementioned problem, and an object thereof is to promote utilization of a function for external charging included in a vehicle.

(1) An information notification device in accordance with the present disclosure includes: a communication device that can communicate with a terminal device owned by a user of a vehicle that enables external charging; and a control device that controls the communication device, when there is a predetermined function among functions for the external charging, to notify the terminal device of information about the predetermined function, the predetermined function having a frequency of use of less than or equal to a predetermined frequency, the functions for the external charging being included in the vehicle.

(2) An information notification system in accordance with another aspect of the present disclosure includes a terminal device owned by a user of a vehicle that enables external charging, and an information notification device that can communicate with the terminal device. When there is a predetermined function among functions for the external charging, the information notification device notifies the terminal device of information about the predetermined function, the predetermined function having a frequency of use of less than or equal to a predetermined frequency, the functions for the external charging being included in the vehicle.

(3) An information notification method in accordance with another aspect of the present disclosure includes: determining whether or not there is a predetermined function among functions for external charging, the predetermined function having a frequency of use of less than or equal to a predetermined frequency, the functions for the external charging being included in a vehicle that enables the external charging; and notifying a terminal device owned by a user of the vehicle of information about the predetermined function when the predetermined function is included in the functions for the external charging.

According to the information notification device, the information notification system, and the information notification method described above, when there is a predetermined function with a frequency of use of less than or equal to a predetermined frequency, information about the predetermined function is notified from the information notification device to the terminal device. The terminal device is, for example, a smartphone owned by the user, or the like. For example, it is expected that the user may leave the vehicle during the external charging. By notifying the terminal device owned by the user, instead of the vehicle, of the information about the predetermined function, the user can recognize how to use the predetermined function, the presence thereof, or the like. Accordingly, utilization of the functions for the external charging included in the vehicle can be promoted.

(4) In an embodiment, when there is a function for which a number of times of the external charging in which the function has not been used reaches a predetermined number of times, or when there is a function which is not used for a period exceeding a predetermined period, the control device determines that the frequency of use of the function is less than or equal to the predetermined frequency.

When there is a function which is not used a predetermined consecutive number of times or which is not used for a predetermined period, it is conceivable that the user of the vehicle may not know that the vehicle has the function, or may not know how to use the function. Thus, by outputting information about the function to the user's terminal device in a case as described above, the user can recognize how to use the function, the presence thereof, or the like. Accordingly, utilization of the functions for the external charging included in the vehicle can be promoted.

(5) In the information notification device in accordance with an embodiment, the information includes information to promote utilization of the predetermined function. When the control device receives a notification indicating that a selection to use the predetermined function is made, the control device makes a setting to activate the predetermined function.

(6) In the information notification system in accordance with an embodiment, the information includes information to promote utilization of the predetermined function. The terminal device receives a user operation to select whether or not to use the predetermined function. When the information notification device receives, from the terminal device, a notification indicating that a selection to use the predetermined function is made, the information notification device makes a setting to activate the predetermined function.

(7) In the information notification method in accordance with an embodiment, the information includes information to promote utilization of the predetermined function. The information notification method further includes: receiving, by the terminal device, a user operation to select whether or not to use the predetermined function; and making a setting to activate the predetermined function upon receiving, from the terminal device, a notification indicating that a selection to use the predetermined function is made.

According to (5) to (7) described above, the information about the predetermined function notified from the information notification device to the terminal device includes information to promote utilization of the predetermined function. In addition, for example, when the user performs an operation to use the predetermined function on the terminal device, a notification indicating that a selection to use the predetermined function is made is transmitted from the terminal device to the information notification device. When the control device receives the notification, the control device makes a setting to activate the predetermined function. Thus, the user can make a setting to use the predetermined function from the terminal device. Although it is expected that the user may leave the vehicle during the external charging, for example, the user can make a setting to use the predetermined function without going back to a position where the vehicle is located. Accordingly, the user's convenience is enhanced, and utilization of the functions for the external charging is promoted.

(8) In an embodiment, the functions for the external charging include a timer charging function. The timer charging function is a function of starting the external charging when a preset start time is reached, or a function of completing the external charging at a preset end time.

According to the configuration described above, utilization of the timer charging function can be promoted when the frequency of use of the timer charging function is less than or equal to the predetermined frequency.

(9) In an embodiment, the functions for the external charging include a charging upper limit function of setting an upper limit of a charging amount in the external charging.

According to the configuration described above, utilization of the charging upper limit function can be promoted when the frequency of use of the charging upper limit function is less than or equal to the predetermined frequency.

(10) In an embodiment, the vehicle enables external power feeding that feeds power to a power source external to the vehicle. The control device controls the communication device to notify the terminal device of information about the predetermined function when the predetermined function is included in functions for the external power feeding, the functions being included in the vehicle.

According to the configuration described above, utilization of a function for the external power feeding can be promoted when the frequency of use of the function for the external power feeding is less than or equal to the predetermined frequency.

(11) In an embodiment, the vehicle can cooperate with a server that manages a power system including the power source. When the vehicle cooperates with the server, the vehicle performs the external charging upon receiving a charging request from the server, and performs the external power feeding upon receiving a power feeding request from the server. When a function which is included in the vehicle and cooperates with the server is the predetermined function, the control device controls the communication device to notify the terminal device of information about the function which cooperates with the server.

According to the configuration described above, utilization of the function which cooperates with the server can be promoted when the frequency of use of the function which cooperates with the server is less than or equal to the predetermined frequency.

(12) A vehicle in accordance with another aspect of the present disclosure includes the information notification device according to any one of (1), (4), (5), and (8) to (11) described above.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a flowchart showing a procedure for processing performed in the charging setting system.

DETAILED DESCRIPTION

Figure 1:
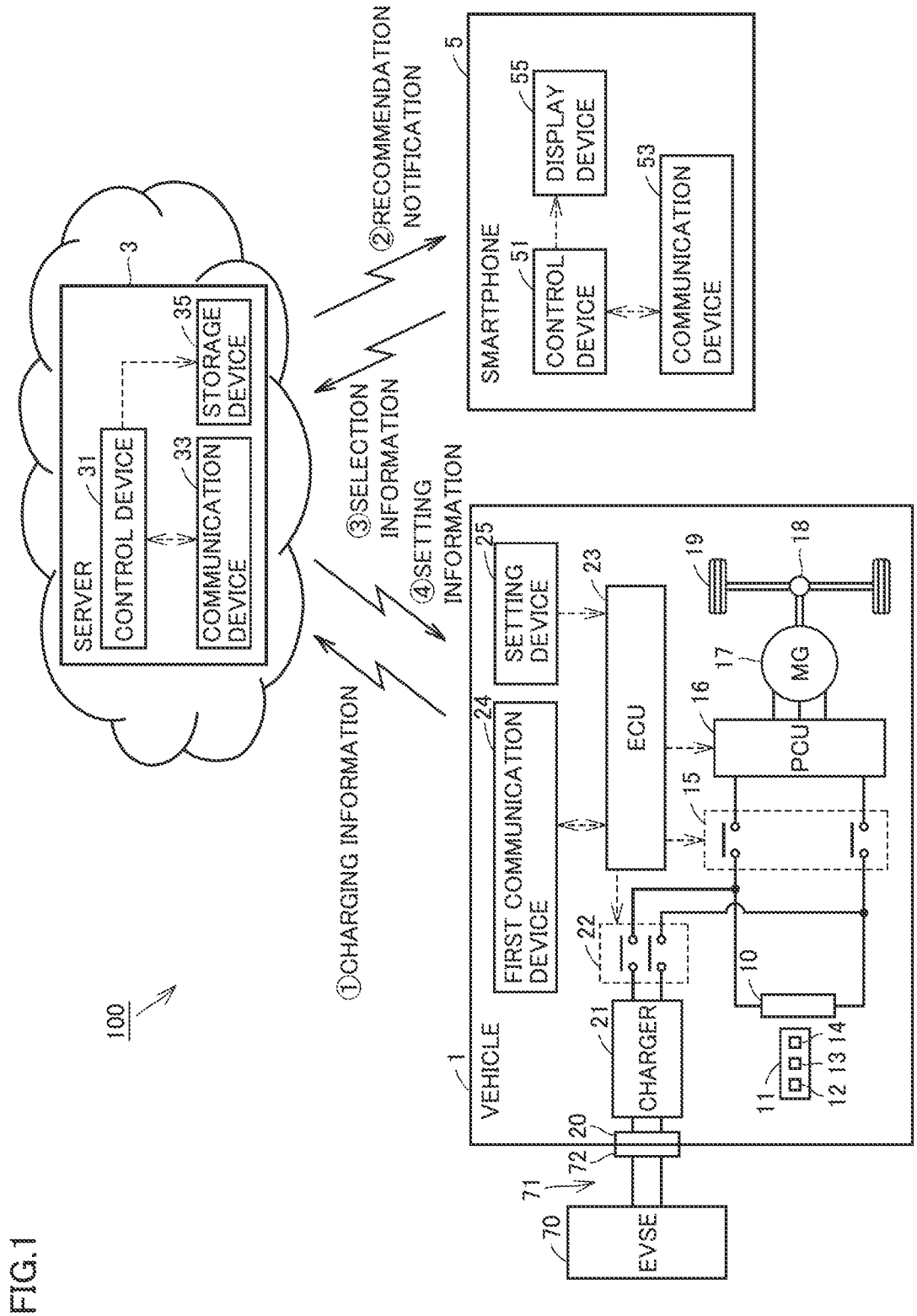
FIG. 1 is an overall configuration diagram of a charging setting system in accordance with a first embodiment.

Hereinafter, embodiments of the present disclosure will be described in detail, with reference to the drawings. It should be noted that identical or corresponding parts in the drawings will be designated by the same reference numerals, and the description thereof will not be repeated.

First Embodiment

Overall Configuration

FIG. 1 is an overall configuration diagram of a charging setting system 100 in accordance with a first embodiment. Referring to FIG. 1, charging setting system 100 includes a vehicle 1, a server 3, and a smartphone 5. Server 3 is a server that obtains a variety of information from vehicle 1 at a predetermined cycle and manages the state of vehicle 1. Smartphone 5 is a smartphone owned by a user of vehicle 1. Vehicle 1 and smartphone 5 are associated with each other and are registered in server 3. Vehicle 1 and smartphone 5 each can perform bidirectional communication with server 3. Vehicle 1 and smartphone 5 can perform bidirectional communication with each other via server 3.

Vehicle 1 in accordance with the first embodiment is an electric car equipped with a battery 10 for traveling. Vehicle 1 enables external charging that charges vehicle-mounted battery 10 using power supplied from a charging stand (electric vehicle supply equipment: EVSE) 70 external to the vehicle. It should be noted that vehicle 1 may be any vehicle that enables external charging, and is not limited to an electric car. For example, vehicle 1 may be a plug-in hybrid car or a fuel cell car.

Vehicle 1 has functions for the external charging. Examples of the functions for the external charging include a timer charging function, a charging upper limit function, and the like.

The timer charging function is a function of starting the external charging when a preset start time is reached, for example. Alternatively, the timer charging function may be a function of completing the external charging at a preset end time. The first embodiment will describe an example where a start time is set when the timer charging function is used.

The charging upper limit function is a function of setting an upper limit of a charging amount of battery 10 in the external charging. The charging upper limit function may set an upper limit value of the charging amount, or may set an upper limit SOC (state of charge), for example. The first embodiment will describe an example where an upper limit SOC is set when the charging upper limit function is used. For example, when the upper limit SOC is set to an SOC of 80%, the external charging ends when the SOC of battery 10 reaches 80%.

There may be cases where, even though vehicle 1 includes functions for the external charging as described above, the user of vehicle 1 does not know how to use the functions for the external charging, or does not even know that vehicle 1 includes such functions. Although it is possible to make a setting to activate the functions for the external charging (i.e., make an ON setting) by default, such a setting may be inconvenient for a user who does not want to use the functions for the external charging, because the user has to cancel the setting (i.e., make an OFF setting). Accordingly, it is desired to promote utilization of the functions for the external charging included in vehicle 1, while suppressing inconvenience for the user.

Thus, in charging setting system 100 in accordance with the first embodiment, when there is a predetermined function with a frequency of use of less than or equal to a predetermined frequency (i.e., which is less frequently used) among the functions for the external charging, a notification about the predetermined function (hereinafter also referred to as a "recommendation notification") is transmitted to the user's smartphone 5. Vehicle 1 transmits charging information to server 3 at a predetermined cycle. The charging information includes information indicating a charging log, usage history information of the functions for the external charging, information indicating the setting statuses (ON/OFF) of the functions for the external charging, and the like, for example. The details of the charging information will be described later. Server 3 stores and analyzes the charging information received at the predetermined cycle, and determines whether or not there is a predetermined function among the functions for the external charging. When the predetermined function is included, server 3 transmits a recommendation notification to smartphone 5. By the transmission of the recommendation notification, the user can understand how to use the predetermined function, or can recognize the presence of the predetermined function. In addition, it is expected that the user may leave vehicle 1 during the external charging. By the transmission of the recommendation notification to smartphone 5, the user can timely recognize the recommendation notification.

Further, in charging setting system 100 in accordance with the first embodiment, the user can make an ON setting for the predetermined function for which the recommendation notification has been transmitted, through smartphone 5. Thereby, the user at a position away from vehicle 1 can make an ON setting for the predetermined function without going back to a position where vehicle 1 is located. Accordingly, the user's convenience is improved, and thus utilization of the predetermined function is promoted. In the following, configurations of vehicle 1, server 3, and smartphone 5 of charging setting system 100 will be specifically described.

Vehicle

Referring to FIG. 1, vehicle 1 includes battery 10, a monitoring unit 11, a system main relay (SMR) 15, a power control unit (PCU) 16, a motor generator 17, a transmission gear 18, drive wheels 19, an inlet 20, a charger 21, a charging relay 22, an electronic control unit (ECU) 23, a first communication device 24, and a setting device 25.

Battery 10 is mounted on vehicle 1 as a drive power source (that is, a motive power source) for vehicle 1. Battery 10 includes a plurality of stacked cells. Each cell is a secondary cell such as a nickel hydride cell or a lithium ion cell, for example. The cell may also be a cell having a liquid electrolyte, or a cell having a solid electrolyte (i.e., an all-solid cell), between a positive electrode and a negative electrode.

Monitoring unit 11 detects the state of battery 10. Specifically, monitoring unit 11 includes a voltage sensor 12, a current sensor 13, and a temperature sensor 14. Voltage sensor 12 detects a voltage VB of battery 10. Current sensor 13 detects a current IB inputted to and outputted from battery 10. Temperature sensor 14 detects a temperature TB of battery 10. Each sensor outputs a signal indicating its detection result to ECU 23.

SMR 15 is electrically connected to power lines connecting PCU 16 and battery 10. When SMR 15 is in a closed state, power is supplied from battery 10 to PCU 16. When SMR 15 is in an open state, power is not supplied from battery 10 to PCU 16. SMR 15 switches between the closed state and the open state according to a control signal from ECU 23.

PCU 16 converts DC power stored in battery 10 into AC power and supplies the AC power to motor generator 17, in response to a control signal from ECU 23. Further, PCU 16 converts AC power generated by motor generator 17 into DC power and supplies the DC power to battery 10. PCU 16 includes, for example, an inverter, and a converter that steps up a DC voltage supplied to the inverter to a voltage that is more than or equal to an output voltage of battery 10.

Motor generator 17 is an AC rotating electrical machine, and is, for example, a permanent-magnet type synchronous motor that includes a rotor having a permanent magnet embedded therein. The rotor of motor generator 17 is mechanically connected to drive wheels 19 via transmission gear 18. By receiving the AC power from PCU 16, motor generator 17 generates kinetic energy for causing vehicle 1 to travel. The kinetic energy generated by motor generator 17 is transmitted to transmission gear 18. On the other hand, when causing vehicle 1 to be decelerated or stopped, motor generator 17 converts kinetic energy of vehicle 1 into electrical energy. AC power generated by motor generator 17 is converted by PCU 16 into DC power and the DC power is supplied to battery 10. Thereby, regenerative power can be stored in battery 10. Thus, motor generator 17 generates a driving force or a braking force for vehicle 1, with exchange of power with battery 10 (i.e., charging and discharging of battery 10).

It should be noted that, when vehicle 1 is a plug-in hybrid car further equipped with an engine (not shown) as a motive power source, an output of the engine can be used as a driving force for traveling, in addition to an output of motor generator 17. Alternatively, vehicle 1 can further be equipped with a motor generator (not shown) for generating power using the output of the engine, to generate power for charging battery using the output of the engine.

To inlet 20, a charging connector 72 of a charging cable 71 connected to EVSE 70 can be connected. Generally, inlet 20 is covered with a charging lid (not shown). When the charging lid is opened, the user can connect charging connector 72 to inlet 20.

EVSE 70 in accordance with the first embodiment supplies alternating current (AC) power generated based on power supplied from a system power source, to vehicle 1. EVSE 70 may be installed at the user's home or the like, or in a public place, for example.

Charger 21 is electrically connected between inlet 20 and battery 10. During the external charging, charger 21 converts the AC power inputted from EVSE 70 to inlet 20 into DC power for charging battery 10. The power converted by charger 21 is supplied to battery 10, and battery 10 is charged.

Charging relay 22 is electrically connected between charger 21 and battery 10. Charging relay 22 switches between a closed state and an open state according to a control signal from ECU 23.

First communication device 24 can perform bidirectional communication with server 3. First communication device 24 includes a communication module in conformity with a communication standard such as Wideband Code Division Multiple Access (W-CDMA) or Long Term Evolution (LTE), or a wireless local area network (LAN) standard such as Institute of Electrical and Electronic Engineers (IEEE) 802.11, for example.

ECU 23 includes a central processing unit (CPU), a memory (a random access memory (RAM) and a read only memory (ROM)), and an input/output buffer for inputting and outputting various signals (all not shown). The CPU expands a program stored in the ROM into the RAM and executes the program. In the program stored in the ROM, processing to be performed by the CPU is described. ECU 23 performs predetermined arithmetic processing using the CPU, based on the various signals inputted from the input/output buffer and information stored in the memory, and controls each device (SMR 15, PCU 16, charging relay 22, charger 21, first communication device 24, and the like) such that vehicle 1 enters a desired state, based on an arithmetic result. It should be noted that control of these devices can be processed not only by software but also by constructed dedicated hardware (electronic circuitry).

ECU 23 estimates the degree of deterioration of battery 10 using voltage VB, current IB, and temperature TB of battery 10 obtained from monitoring unit 11, and the like. For example, ECU 23 estimates a capacity retention ratio as the degree of deterioration of battery 10. The capacity retention ratio is the ratio of a present full charge capacity to a full charge capacity in an initial state of battery 10. A known technique can be used to estimate the capacity retention ratio.

ECU 23 has the timer charging function and the charging upper limit function, for example, as the functions for the external charging. It should be noted that the functions described above are merely examples of the functions for the external charging, and the functions for the external charging are not limited to the functions described above. The functions for the external charging can include other various functions.

Setting device 25 is a device for making a setting for the functions for the external charging. Setting device 25 receives a user operation. In response to the user operation, setting device 25 switches between an ON setting and an OFF setting for each function for the external charging. For example, when the timer charging function is set to ON, setting device 25 receives an input of a start time of timer charging. Further, when the charging upper limit function is set to ON, setting device receives an input of an upper limit SOC. Setting device 25 outputs information indicating the inputted start time or upper limit SOC to ECU 23. Thereby, the start time and/or the upper limit SOC set by the user are/is stored in the memory of ECU 23, for example. It should be noted that, for example, a navigation device not shown, a multi-information display not shown, or the like may have the function of setting device 25.

In a case where the timer charging function is set to ON and a start time is set, ECU 23 starts the external charging when the start time is reached. Specifically, when the start time is reached, ECU 23 sets charging relay 22 to the closed state to operate charger 21. In the external charging, in a case where the charging upper limit function is set to ON, ECU 23 completes the external charging when the SOC of battery 10 reaches an upper limit SOC, and in a case where the charging upper limit function is set to OFF, ECU 23 completes the external charging when battery 10 is fully charged, for example. The user may set a start time such that the external charging will be completed at a time when the user uses vehicle 1, for example. Here, deterioration of battery 10 (secondary battery) can proceed when battery 10 is left in a fully charged state. In a case where the timer charging function is used, the time for which battery is left in a fully charged state can be shortened, when compared with a case where the timer charging function is not used. Accordingly, deterioration of battery 10 can be suppressed by using the timer charging function. Further, in the case where the timer charging function is used, charging can be performed during a time in which a lower power rate is set, such as during the night time, for example, and thus electricity expense can be suppressed.

In addition, in a case where the charging upper limit function is set to ON and an upper limit SOC is set, ECU 23 completes the external charging when the SOC of battery 10 reaches the upper limit SOC. In a case where the charging upper limit function is used, the SOC of battery 10 can be maintained at an SOC lower than full charge in the external charging. Accordingly, this can suppress battery 10 from being left in a fully charged state, and thus can suppress deterioration of battery 10.

ECU 23 controls first communication device 24 to transmit the charging information to server 3 at the predetermined cycle. The charging information includes information indicating a charging log, usage history information of the functions for the external charging, information indicating the setting statuses of the functions for the external charging, information about the state of deterioration of battery 10, and the like, for example. The information indicating the setting statuses of the functions for the external charging in the first embodiment is, specifically, information indicating whether the timer charging function is set to ON or OFF, and whether the charging upper limit function is set to ON or OFF.

Further, ECU 23 also transmits the charging information to server 3 when it senses that charging connector 72 is connected to inlet 20. In this case, ECU 23 further includes connection information indicating that charging connector 72 is connected to inlet 20, in the charging information.

Server

Server 3 includes a control device 31, a communication device 33, and a storage device 35. Communication device 33 communicates with vehicle 1 and smartphone 5. It should be noted that server 3 in accordance with the first embodiment corresponds to an example of the "information notification device" in accordance with the present disclosure.

Communication device 33 includes a communication module in conformity with a communication standard such as W-CDMA or LTE, a wireless LAN standard such as IEEE 802.11, or a wired LAN standard such as Ethernet (registered trademark), for example.

Storage device 35 stores information of vehicle 1 and information of a terminal device owned by the user of vehicle 1 (smartphone 5 in the first embodiment) in an associated manner.

Control device 31 includes a CPU, a memory, an input/output interface, and the like (all not shown). Control device 31 implements various functions of server 3 based on information received via communication device 33 and information stored in the memory.

Control device 31 obtains the charging information from vehicle 1 via communication device 33. Based on the charging information, control device 31 determines whether or not there is a predetermined function with a frequency of use of less than or equal to a predetermined frequency (i.e., which is less frequently used) among the functions for the external charging. More specifically, when the connection information is included in the charging information, control device 31 determines whether or not there is a predetermined function. For example, control device 31 determines whether or not a function for the external charging corresponds to the predetermined function, based on conditions (1) and (2) described below. Specifically, when there is a function which satisfies any of the conditions (1) and (2) described below among the functions for the external charging, control device 31 determines that the function is less frequently used. It should be noted that the conditions can be changed as appropriate, based on the configuration of the charging setting system and the like, for example.

(1) A condition that a period for which the function is not used exceeds a predetermined period; and
(2) A condition that the number of times of the external charging in which the function has not been used reaches a predetermined number of times.

When control device 31 determines that there is a predetermined function, control device 31 transmits a recommendation notification to the terminal device associated with vehicle 1 (that is, smartphone 5). Specifically, when control device 31 determines that there is a predetermined function, control device 31 transmits information about the predetermined function to smartphone 5. The information about the predetermined function includes information to promote utilization of the predetermined function. The information about the predetermined function may include how to use the predetermined function.

Further, when control device 31 receives selection information (described later for details), which is a response to the recommendation notification, from smartphone 5, control device 31 generates setting information and transmits the setting information to vehicle 1. The selection information at least includes information on whether or not to use the predetermined function, for example.

Here, it is assumed as an example that the predetermined function is the timer charging function. The user who has confirmed the recommendation notification on smartphone 5 selects whether or not to use the timer charging function, through an operation on smartphone 5, for example. When the user selects to use the timer charging function, the user may set a start time, or may not set a start time. When a start time is not set, the selection information includes information to use the timer charging function. When a start time is set, the selection information includes the information to use the timer charging function and information indicating the start time. When the selection information includes the information to use the timer charging function and also includes the information indicating the start time, control device 31 generates setting information including information to set the timer charging function to ON and the information indicating the start time set by the user through smartphone 5, and transmits the generated setting information to vehicle 1. When the selection information includes the information to use the timer charging function but does not include the information indicating the start time, control device 31 sets a start time of the timer charging, generates setting information including the information to set the timer charging function to ON and information indicating the set start time, and transmits the generated setting information to vehicle 1.

Control device 31 sets the start time of the timer charging as described below, for example. Control device 31 learns a time when the user uses vehicle 1 for each day of the week, based on the charging log received from vehicle 1 at the predetermined cycle, for example. Then, control device 31 sets a start time such that the SOC of battery 10 becomes a fully charged state, for example, at the time when the user uses vehicle 1, according to the day of the week. Control device 31 takes a present SOC into consideration when setting the start time. As a learning method, a variety of known techniques can be applied.

In addition, it is assumed as another example that the predetermined function is the charging upper limit function. The user who has confirmed the recommendation notification on smartphone 5 selects whether or not to use the charging upper limit function, through an operation on smartphone 5, for example. When the user selects to use the charging upper limit function, the user may set an upper limit SOC, or may not set an upper limit SOC. When an upper limit SOC is not set, the selection information includes information to use the charging upper limit function. When an upper limit SOC is set, the selection information includes the information to use the charging upper limit function and information indicating the upper limit SOC. When the selection information includes the information to use the charging upper limit function and also includes the information indicating the upper limit SOC, control device 31 generates setting information including information to set the charging upper limit function to ON and the information indicating the upper limit SOC set by the user through smartphone 5, and transmits the generated setting information to vehicle 1. When the selection information includes the information to use the charging upper limit function but does not include the information indicating the upper limit SOC, control device 31 sets an upper limit SOC, generates setting information including the information to set the charging upper limit function to ON and the information indicating the set upper limit SOC, and transmits the generated setting information to vehicle 1.

Control device 31 sets the upper limit SOC for the charging upper limit function as described below, for example. Control device 31 learns an amount of power consumed by vehicle 1 for each day of the week, based on the charging log received from vehicle 1 at the predetermined cycle, for example. Then, control device 31 sets an upper limit SOC according to the day of the week, based on the present SOC and an amount of power estimated to be consumed when vehicle 1 is used next time.

Smartphone

Smartphone 5 is a smartphone owned by the user of vehicle 1. Smartphone 5 includes a dedicated application (dedicated app) for cooperating with vehicle 1 and server 3 downloaded therein. For example, the user can optionally download the dedicated app after purchasing smartphone 5.

Smartphone 5 includes a control device 51, a communication device 53, and a display device 55. Communication device 53 communicates with server 3. Communication device 53 includes a communication module in conformity with a communication standard such as W-CDMA or LTE, a wireless LAN standard such as IEEE 802.11, or a wired LAN standard such as Ethernet (registered trademark), for example.

Control device 51 includes a CPU, a memory, an input/output interface, and the like (all not shown). Control device 51 implements various functions of smartphone 5 based on information received via communication device 53 and information stored in the memory. Further, control device 51 controls display device 55 to display a variety of information.

Display device 55 includes a touch panel display using a liquid crystal panel, or the like, for example. Display device 55 receives a touch operation by the user, for example.

When control device 51 receives the recommendation notification from server 3, control device 51 causes display device 55 to display information according to the information about the predetermined function included in the recommendation notification. Specific examples will be described with reference to FIGS. 2 to 4.

Figure 2:
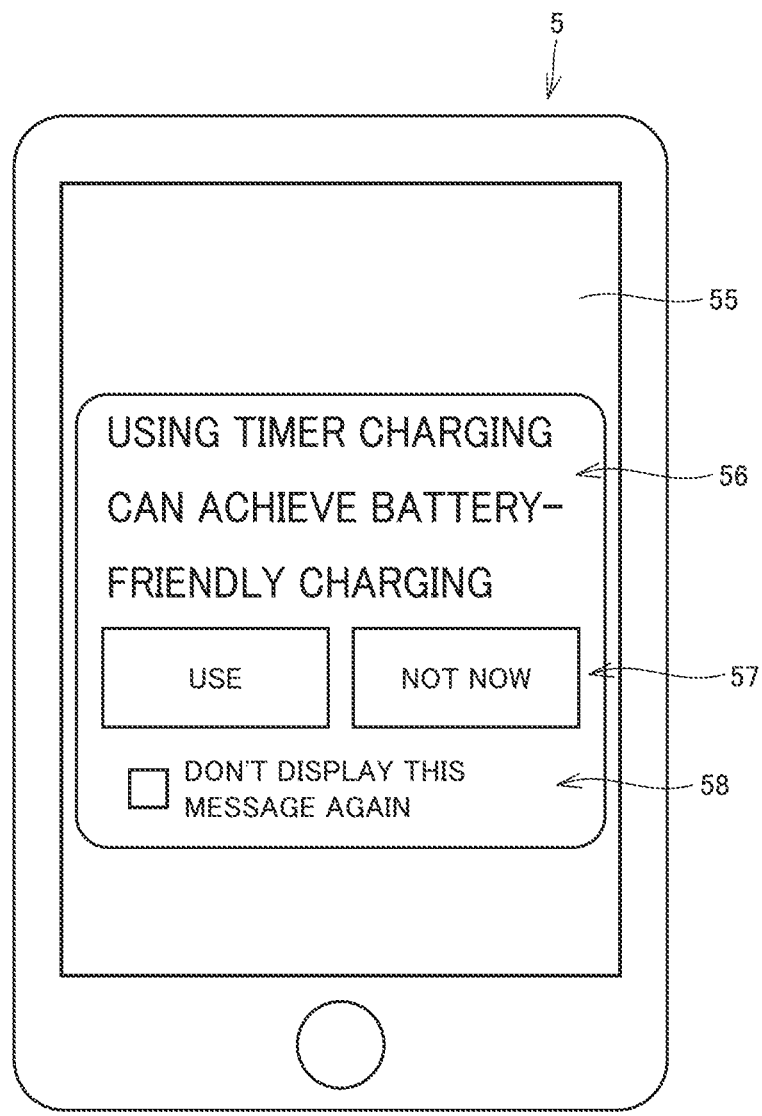
FIG. 2 is a view for illustrating an example in which information about a timer charging function is displayed on a display device of a smartphone.
Figure 3:
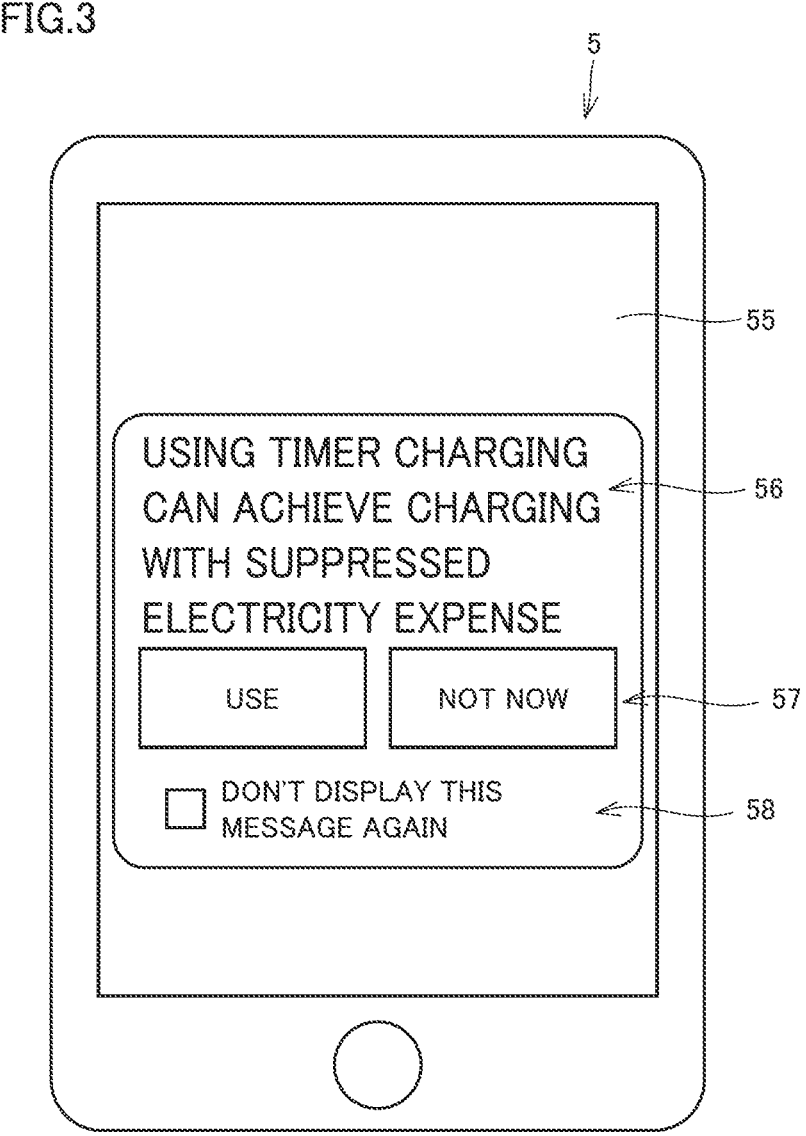
FIG. 3 is a view for illustrating another example in which information about the timer charging function is displayed on the display device of the smartphone.
Figure 4:
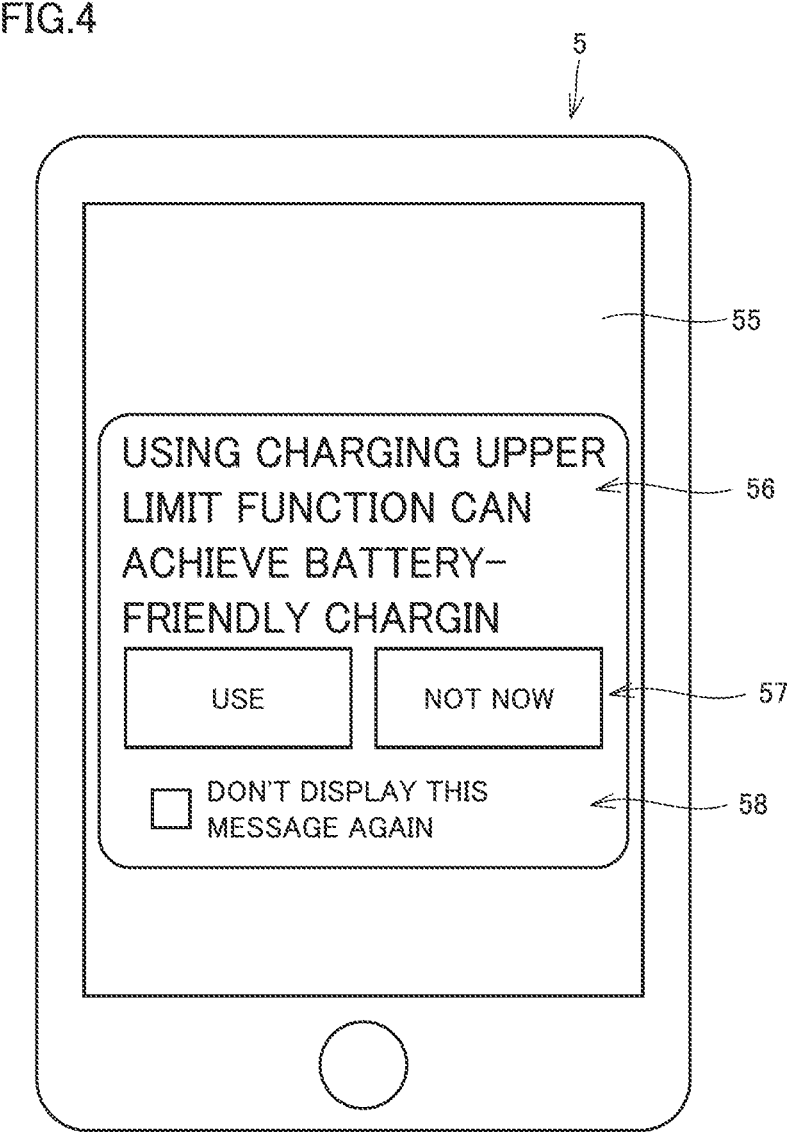
FIG. 4 is a view for illustrating an example in which information about a charging upper limit function is displayed on the display device of the smartphone.

FIG. 2 is a view for illustrating an example in which information about the timer charging function is displayed on display device 55 of smartphone 5. FIG. 3 is a view for illustrating another example in which information about the timer charging function is displayed on display device 55 of smartphone 5. FIG. 4 is a view for illustrating an example in which information about the charging upper limit function is displayed on display device 55 of smartphone 5.

Referring to FIG. 2, when control device 51 receives a recommendation notification about the timer charging function, control device 51 controls display device 55 to display the contents of the recommendation notification. Display device 55 displays a message 56 to promote utilization of the timer charging function, such as "Using timer charging can achieve battery-friendly charging", for example. In addition, display device 55 displays selection buttons 57 for allowing the user to select whether or not to use the timer charging function. Specifically, display device 55 displays two selection buttons "Use" and "Not Now". The user can select whether or not to use the timer charging function, through a touch operation on a selection button. When the user selects the selection button "Use", control device 51 transmits selection information indicating that a selection to use the timer charging function is made, to server 3 via communication device 53. When the user selects the selection button "Not Now", control device 51 transmits selection information indicating that a selection not to use the timer charging function is made, to server 3 via communication device 53. It should be noted that, when the selection button "Use" is selected, control device 51 may control display device 55 to display a screen for setting a start time of the timer charging. When a start time is set in the screen, control device 51 transmits selection information including information indicating the start time, to server 3. A start time may be determined, with the screen for setting a start time of the timer charging being left blank.

In addition, display device 55 displays a check box 58 for not displaying a recommendation notification about the timer charging function again. The user can enter a check mark in check box 58 by a touch operation on check box 58, for example. This can cause display device 55 not to display a recommendation notification about the timer charging function again. For example, when a check mark is entered in check box 58, even though control device 51 receives a recommendation notification about the timer charging function from server 3, control device 51 controls display device 55 so as not to display the recommendation notification. Alternatively, when a check mark is entered in check box 58, control device 51 may notify server 3 not to transmit a recommendation notification about the timer charging function.

Message 56 to promote utilization of the timer charging function can be changed as appropriate. Referring to FIG. 3, as message 56 to promote utilization of the timer charging function, for example, a message "Using timer charging can achieve charging with suppressed electricity expense" may be adopted. For example, control device 31 of server 3 can estimate and select a message assumed to be suitable for the user, from a plurality of prepared messages, based on the charging information obtained from vehicle 1. Further, for example, control device 31 of server 3 may randomly select a message from the plurality of prepared messages.

Referring to FIG. 4, when control device 51 receives a recommendation notification about the charging upper limit function, control device 51 controls display device 55 to display the contents of the recommendation notification. Display device 55 displays message 56 to promote utilization of the charging upper limit function, such as "Using charging upper limit function can achieve battery-friendly charging", for example. In addition, display device 55 displays selection buttons 57 for allowing the user to select whether or not to use the charging upper limit function. Specifically, display device 55 displays two selection buttons "Use" and "Not Now". The user can select whether or not to use the charging upper limit function, through a touch operation on a selection button. When the user selects the selection button "Use", control device 51 transmits selection information indicating that a selection to use the charging upper limit function is made, to server 3 via communication device 53. When the user selects the selection button "Not Now", control device 51 transmits selection information indicating that a selection not to use the charging upper limit function is made, to server 3 via communication device 53. It should be noted that, when the selection button "Use" is selected, control device 51 may control display device 55 to display a screen for setting an upper limit SOC for the charging upper limit function. When an upper limit SOC is set in the screen, control device 51 transmits selection information including information indicating the upper limit SOC, to server 3. An upper SOC may be determined, with the screen for setting an upper limit SOC for the charging upper limit function being left blank.

In addition, display device 55 displays check box 58 for not displaying a recommendation notification about the charging upper limit function again. The user can enter a check mark in check box 58 by a touch operation on check box 58, for example. This can cause display device 55 not to display a recommendation notification about the charging upper limit function again.

Some users may want to prevent display of recommendation notifications about all predetermined functions on smartphone 5. For such a user, it is inconvenient to make a setting to prevent display of a recommendation notification for each function. Accordingly, smartphone 5 can collectively set whether or not to receive the recommendation notifications.

Figure 5:
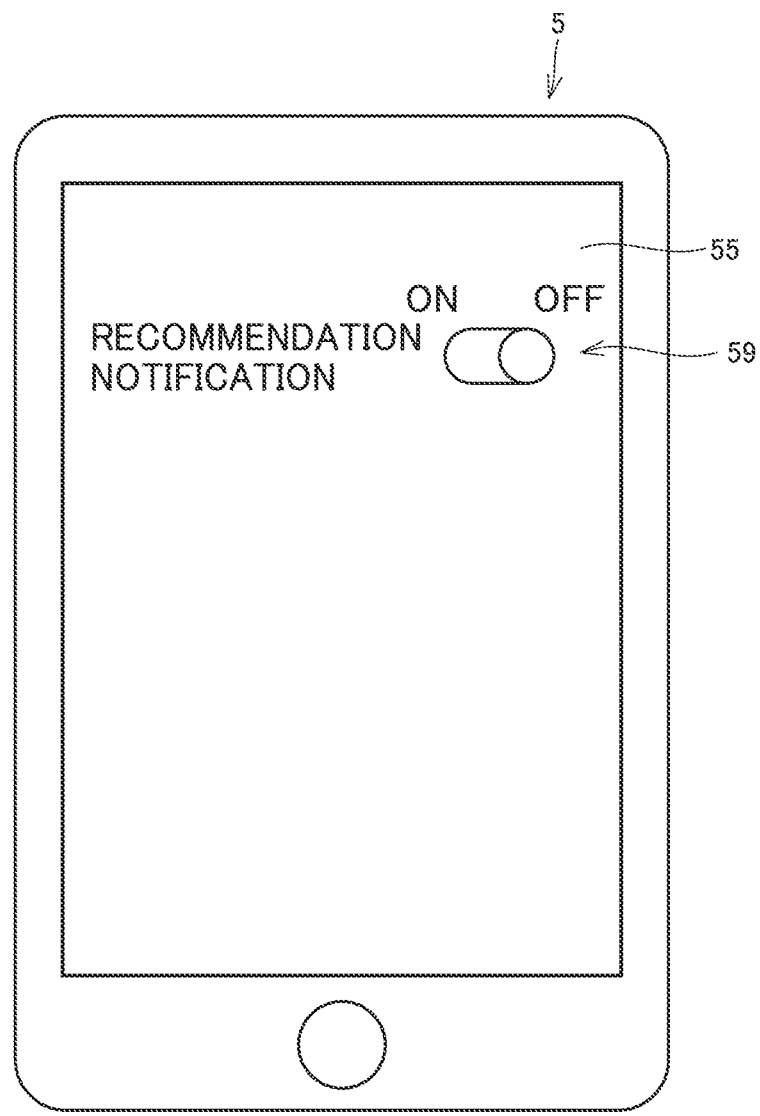
FIG. 5 is a view for illustrating a setting screen for collectively setting whether or not to receive recommendation notifications.

FIG. 5 is a view for illustrating a setting screen for collectively setting whether or not to receive the recommendation notifications. Referring to FIG. 5, display device 55 displays a button 59 for selecting ON/OFF for the recommendation notifications. The user can switch between ON and OFF by a touch operation on button 59. When the user selects OFF, control device 51 causes display device 55 not to display the recommendation notifications about all the predetermined functions again. When the user selects ON, control device 51 causes display device 55 to display the recommendation notifications about the predetermined functions. It should be noted that, in the case where the user selects ON, control device 51 may prevent display of a recommendation notification about a predetermined function for which a setting not to receive a recommendation notification has been made individually (i.e., a predetermined function for which a check mark is entered in check box 58 described in FIGS. 2 to 4).

Processing Performed in Charging Setting System

Figure 6:
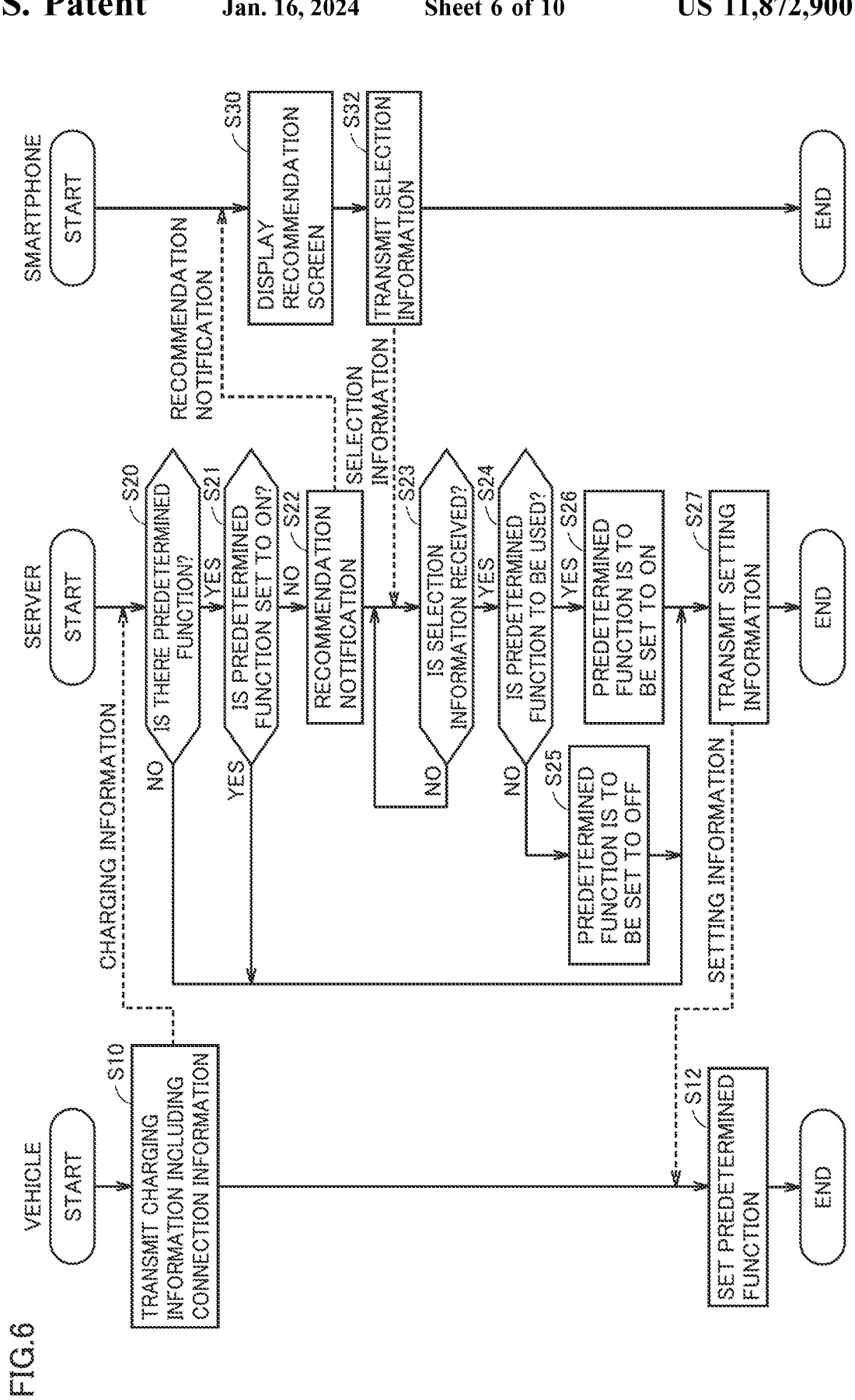
FIG. 6 is a flowchart showing a procedure for processing performed in the charging setting system.

FIG. 6 is a flowchart showing a procedure for processing performed in charging setting system 100. Although a description will be given of a case where the steps (hereinafter a step will be abbreviated to "S") of the flowchart shown in FIG. 6 are implemented by software processing by ECU 23 of vehicle 1, control device 31 of server 3, and control device 51 of smartphone 5, some or all of the steps may be implemented by hardware (electrical circuitry) fabricated within ECU 23, control device 31, and/or control device 51. It should be noted that, in FIG. 6 and later described FIGS. 8 and 10, ECU 23 of vehicle 1, control device 31 of server 3, and control device 51 of smartphone 5 will be simply described as vehicle 1, server 3, and smartphone 5, for easier understanding.

When vehicle 1 senses that charging connector 72 is connected to inlet 20, vehicle 1 starts the processing. Vehicle 1 includes connection information indicating that charging connector 72 is connected to inlet 20 in charging information, and transmits the charging information to server 3 (S10).

When server 3 receives the charging information including the connection information, server 3 determines whether or not there is a predetermined function which is less frequently used among the functions for the external charging (S20). In order to determine whether or not there is a predetermined function, at least one of the conditions (1) and (2) described above can be applied. For example, when a period for which the timer charging function is not used exceeds a predetermined period, server 3 determines that the timer charging function is the predetermined function. When there is no predetermined function (NO in S20), server 3 blanks out information to be included in setting information, for example, and advances the processing to S27.

When there is a predetermined function (YES in S20), server 3 determines whether or not the predetermined function is set to ON in vehicle 1, based on the charging information received from vehicle 1 (S21). When the predetermined function is set to ON (YES in S21), it is expected that the predetermined function may be used in this external charging, and thus server 3 advances the processing to S27 without transmitting a recommendation notification to the user's smartphone 5. Also in this case, server 3 blanks out the information to be included in the setting information, for example.

On the other hand, when the predetermined function is set to OFF (NO in S21), server 3 transmits a recommendation notification to smartphone 5 owned by the user of vehicle 1 (S22).

When smartphone 5 receives the recommendation notification, smartphone 5 displays the contents of the recommendation notification on a screen (S30). It should be noted that, hereinafter, the screen on which the contents of the recommendation notification are displayed will also be referred to as a "recommendation screen". Smartphone 5 transmits selection information in response to an operation of the user on the recommendation screen to server 3 (S32). Specifically, when a selection to use the predetermined function is made, smartphone 5 includes information indicating that the selection to use the predetermined function is made, in the selection information. When a selection not to use the predetermined function is made, smartphone 5 includes information indicating that the selection not to use the predetermined function is made, in the selection information.

Server 3 waits until it receives the selection information (NO in S23). When server 3 receives the selection information (YES in S23), server 3 determines whether the received selection information is the selection information including the information indicating that the selection to use the predetermined function is made, or the selection information including the information indicating that the selection not to use the predetermined function is made (S24).

When the selection information includes the information indicating that the selection not to use the predetermined function is made (NO in S24), server 3 generates setting information indicating that the predetermined function is to be set to OFF (S25).

On the other hand, when the selection information includes the information indicating that the selection to use the predetermined function is made (YES in S24), server 3 generates setting information indicating that the predetermined function is to be set to ON (S26). It should be noted that, when the predetermined function is the timer charging function, server 3 includes information indicating a start time of the timer charging, in the setting information. Specifically, when the selection information received from smartphone 5 includes information indicating a start time of the timer charging set by the user, server 3 includes the information indicating the start time in the setting information. When the selection information does not include the information indicating the start time of the timer charging, server 3 sets a start time of the timer charging based on the result of learning, and includes information indicating the set start time in the setting information. Further, when the predetermined function is the charging upper limit function, server 3 includes information indicating an upper limit SOC, in the setting information. Specifically, when the selection information received from smartphone 5 includes information indicating an upper limit SOC set by the user, server 3 includes the information indicating the upper limit SOC in the setting information. When the selection information does not include the information indicating the upper limit SOC, server 3 sets an upper limit SOC based on the result of learning, and includes information indicating the set upper limit SOC in the setting information.

Server 3 transmits the generated setting information to vehicle 1 (S27).

When vehicle 1 receives the setting information from server 3, vehicle 1 performs a setting for the predetermined function according to the setting information (S12). When the setting information includes the information indicating that the predetermined function is to be set to OFF, vehicle 1 sets the predetermined function to OFF. When the setting information includes the information indicating that the predetermined function is to be set to ON, vehicle 1 sets the predetermined function to ON. For example, when the predetermined function is the timer charging function, vehicle 1 sets a start time of the timer charging according to the start time included in the setting information. When the predetermined function is the charging upper limit function, vehicle 1 sets an upper limit SOC in the external charging according to the upper limit SOC included in the setting information.

As described above, in charging setting system 100 in accordance with the first embodiment, when there is a predetermined function with a frequency of use of less than or equal to a predetermined frequency (i.e., which is less frequently used) among the functions for the external charging, a recommendation notification is transmitted from server 3 to smartphone 5. Thereby, the user can recognize how to use the predetermined function, the presence thereof, or the like. Accordingly, utilization of the functions for the external charging included in vehicle 1 can be promoted.

Further, it is expected that the user may leave vehicle 1 during the external charging. For example, the user may leave vehicle 1 after connecting charging connector 72 of EVSE 70 to inlet 20 of vehicle 1. By the transmission of the recommendation notification to smartphone 5 rather than vehicle 1 or EVSE 70, the user can timely recognize the reception of the recommendation notification.

In addition, in charging setting system 100 in accordance with the first embodiment, the predetermined function for which the recommendation notification has been transmitted can be set to ON/OFF through smartphone 5. Thus, the user does not have to go back to the position where vehicle 1 is located, in order to set the predetermined function to ON, for example. Accordingly, the user's convenience can be enhanced. Thereby, utilization of the functions for the external charging included in vehicle 1 can be promoted.

In addition, in charging setting system 100 in accordance with the first embodiment, server 3 can set a start time of the timer charging, for example, based on the result of learning. Thereby, a start time suitable for the user can be set by the user merely making a selection to use the timer charging function through smartphone 5, for example. Since this can save the user from having to set a start time, the user's convenience can be enhanced. Thereby, utilization of the functions for the external charging included in vehicle 1 can be promoted.

Further, in charging setting system 100 in accordance with the first embodiment, server 3 can set an upper limit SOC for the charging upper limit function, for example, based on the result of learning. Thereby, an upper limit SOC suitable for the user can be set by the user merely making a selection to use the charging upper limit function through smartphone 5, for example. Since this can save the user from having to set an upper limit SOC, the user's convenience can be enhanced. Thereby, utilization of the functions for the external charging included in vehicle 1 can be promoted.

First Variation

In the first embodiment, as shown in S20 to S22 of FIG. 6, when there is a predetermined function which is less frequently used among the functions for the external charging (YES in S20), and the predetermined function is not set to ON in vehicle 1 (NO in S21), a recommendation notification is transmitted from server 3 to smartphone 5 (S22). However, another condition may further be imposed when transmitting the recommendation notification in S22.

For example, a recommendation condition that "the capacity retention ratio of battery 10 is lower than a threshold value" can be imposed. That is, when there is a predetermined function which is less frequently used among the functions for the external charging, and the predetermined function is not set to ON in vehicle 1, and the capacity retention ratio of battery 10 is lower than a threshold value, a recommendation notification is transmitted from server 3 to smartphone 5. When the capacity retention ratio of the battery 10 is lower than the threshold value, deterioration of battery 10 proceeds to some extent. By transmitting the recommendation notification to promote utilization of the functions for the external charging in such a case, further deterioration of battery 10 due to the external charging (for example, deterioration caused by leaving fully charged battery 10) can be suppressed. It should be noted that, as described above, the capacity retention ratio of battery 10 is included in the charging information. That is, server 3 can determine whether or not the capacity retention ratio of battery 10 is lower than the threshold value, based on the charging information.

Further, instead of or in addition to the recommendation condition, conditions such as "battery 10 is charged to a fully charged state, and the number of times battery has been left in a fully charged state for a fixed time or more reaches a fixed number of times", "a first time has passed since the download of a dedicated app to smartphone 5", and/or "a second time has passed since the purchase of vehicle 1", and the like may be adopted as the recommendation condition. The first time and the second time are each a time that can be set as appropriate.

Second Variation

The first embodiment has described an example of AC charging in which AC power is supplied from EVSE 70 to vehicle 1, as the external charging. However, the external charging is not limited to the AC charging. The external charging may be direct current (DC) charging. In this case, DC power is supplied from the EVSE to vehicle 1.

Second Embodiment

The first embodiment has described an example where vehicle 1 and smartphone 5 communicate with each other via server 3. However, vehicle 1 and smartphone 5 may directly communicate with each other without server 3. A second embodiment will describe an example where vehicle 1 and smartphone 5 directly communicate with each other.

Figure 7:
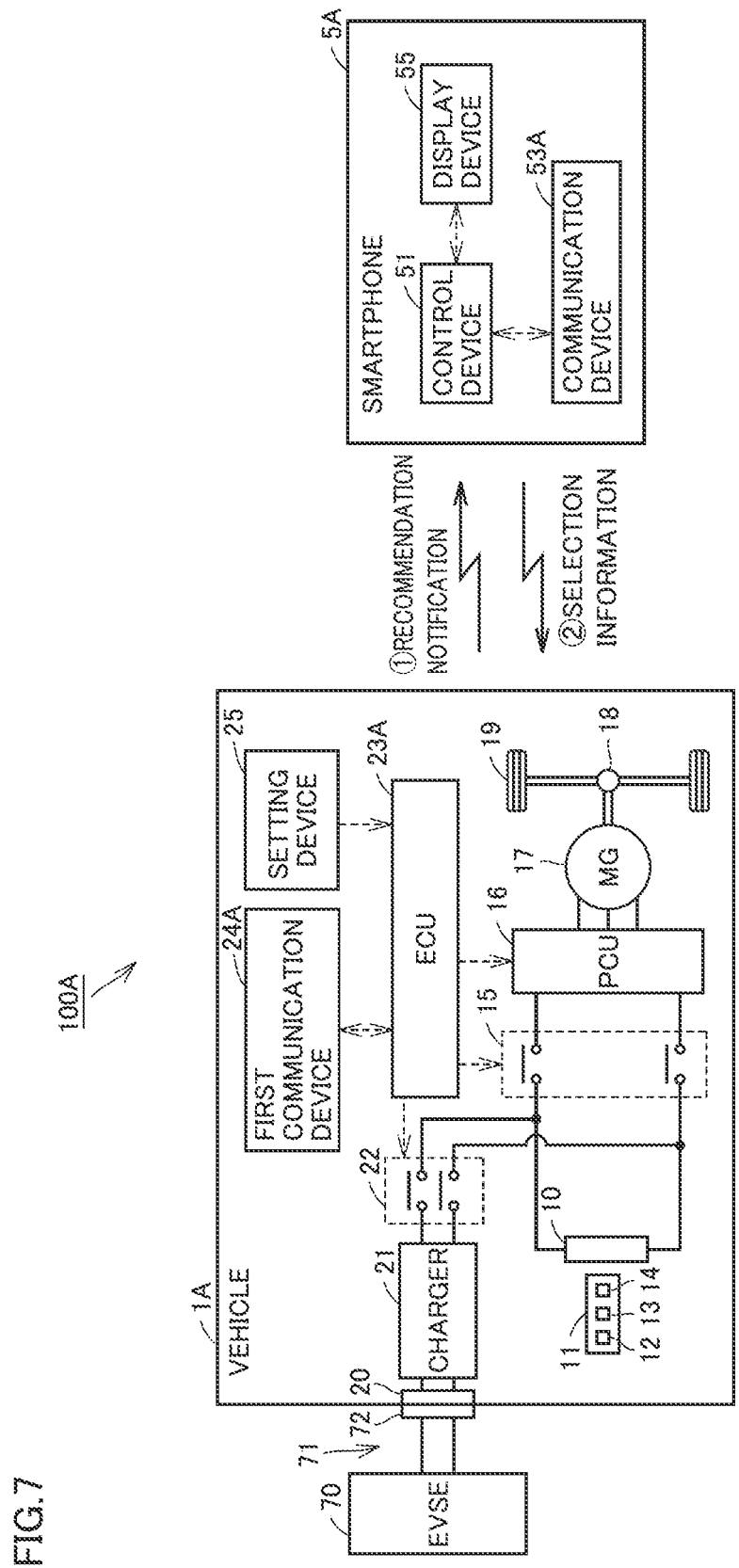
FIG. 7 is an overall configuration diagram of a charging setting system in accordance with a second embodiment.

FIG. 7 is an overall configuration diagram of a charging setting system 100A in accordance with the second embodiment. Referring to FIG. 7, charging setting system 100A in accordance with the second embodiment includes a vehicle 1A and a smartphone 5A. In charging setting system 100A in accordance with the second embodiment, when there is a predetermined function which is set to OFF in a case where vehicle 1A senses that charging connector 72 is connected to inlet 20, vehicle 1A transmits a recommendation notification to smartphone 5A. When a selection in response to the recommendation notification is made in smartphone 5A, selection information is transmitted from smartphone 5A to vehicle 1A. Vehicle 1A makes a setting for the predetermined function according to the selection information.

Smartphone 5A has basically the same configuration as that of smartphone 5 in accordance with the first embodiment, except for a communication device 53A. Communication device 53A can communicate with vehicle 1A.

Vehicle 1A includes the function of server 3 in accordance with the first embodiment. Vehicle 1A has basically the same configuration as that of vehicle 1 in accordance with the first embodiment, except for a first communication device 24A and an ECU 23A. First communication device 24A can communicate with smartphone 5A. It should be noted that ECU 23A and first communication device 24A of vehicle 1A in accordance with the second embodiment correspond to an example of the "information notification device" in accordance with the present disclosure.

When ECU 23A senses that charging connector 72 is connected to inlet 20, ECU 23A determines whether or not there is a predetermined function among the functions for the external charging. For example, when there is a function which satisfies any of the conditions (1) and (2) described above among the functions for the external charging, ECU 23A determines the function as a predetermined function.

When ECU 23A determines that there is a predetermined function, ECU 23A transmits a recommendation notification to smartphone 5A.

When ECU 23A receives selection information from smartphone 5A, ECU 23A makes a setting for the target predetermined function according to the selection information.

As an example, when the selection information includes information not to use the timer charging function, ECU 23A sets the timer charging function to OFF. When the selection information includes information to use the timer charging function, ECU 23A sets the timer charging function to ON, and sets a start time of the timer charging. For example, when the selection information includes information indicating a start time of the timer charging, ECU 23A sets a start time of the timer charging according to the start time included in the setting information. When the selection information does not include the information indicating the start time of the timer charging, ECU 23A sets a start time.

ECU 23A sets the start time of the timer charging as described below, for example. ECU 23A learns a time when the user uses vehicle 1A for each day of the week. Then, in a case where the timer charging function is set to ON when charging connector 72 is connected to inlet 20, ECU 23A sets a start time such that the SOC of battery 10 becomes a fully charged state, for example, at the time when the user uses vehicle 1A, according to the day of the week. ECU 23A takes the present SOC into consideration when setting the start time. As a learning method, a variety of known techniques can be applied.

As another example, when the selection information includes information not to use the charging upper limit function, ECU 23A sets the charging upper limit function to OFF. When the selection information includes information to use the charging upper limit function, ECU 23A sets the charging upper limit function to ON, and sets an upper limit SOC. For example, when the selection information includes information indicating an upper limit SOC, ECU 23A sets an upper limit SOC according to the upper limit SOC included in the setting information. When the selection information does not include the information indicating the upper limit SOC, ECU 23A sets an upper limit SOC.

ECU 23A sets the upper limit SOC for the charging upper limit function as described below, for example. ECU 23A learns an amount of power consumed by vehicle 1A for each day of the week, for example. Then, ECU 23A sets an upper limit SOC according to the day of the week, based on the present SOC and an amount of power estimated to be consumed when vehicle 1A is used next time.

Figure 8:
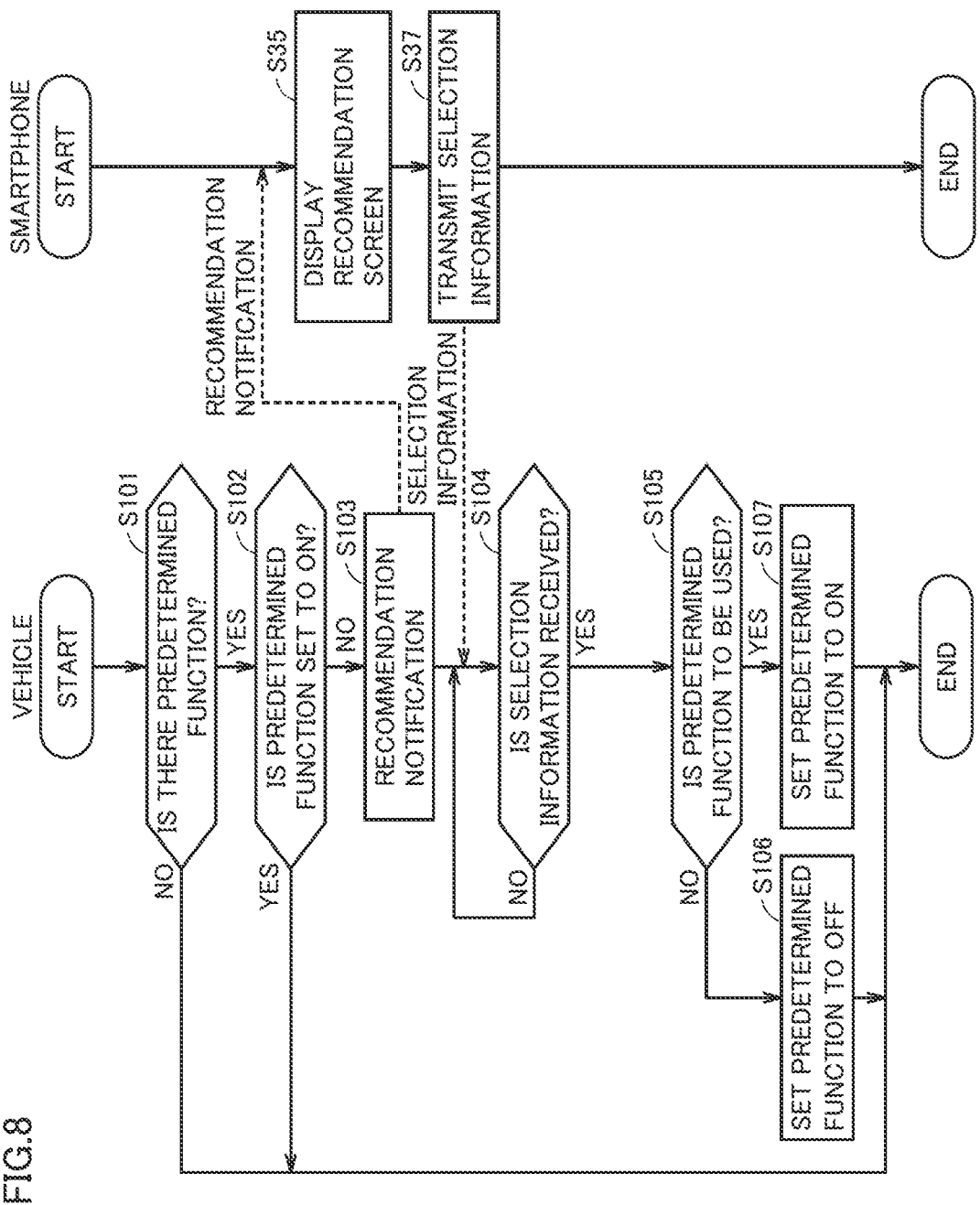
FIG. 8 is a flowchart showing a procedure for processing performed in the charging setting system in accordance with the second embodiment.

FIG. 8 is a flowchart showing a procedure for processing performed in charging setting system 100A in accordance with the second embodiment.

When vehicle 1A senses that charging connector 72 is connected to inlet 20, vehicle 1A starts the processing. Vehicle 1A determines whether or not there is a predetermined function which is less frequently used among the functions for the external charging (S101). When there is no predetermined function (NO in S101), vehicle 1A terminates the processing.

When there is a predetermined function (YES in S101), vehicle 1A determines whether or not the predetermined function is set to ON (S102). When the predetermined function is set to ON (YES in S102), vehicle 1A terminates the processing without transmitting a recommendation notification, because it may use the predetermined function in this external charging.

On the other hand, when the predetermined function is set to OFF (NO in S102), vehicle 1A transmits a recommendation notification to the user's smartphone 5A (S103).

When smartphone 5A receives the recommendation notification, smartphone 5A displays the contents of the recommendation notification (S35). Smartphone 5A transmits selection information in response to an operation of the user on an recommendation screen to vehicle 1A (S37). Specifically, when a selection to use the predetermined function is made, smartphone 5A includes information indicating that the selection to use the predetermined function is made, in the selection information. When a selection not to use the predetermined function is made, smartphone 5A includes information indicating that the selection not to use the predetermined function is made, in the selection information.

Vehicle 1A waits until it receives the selection information (NO in S104). When vehicle 1A receives the selection information (YES in S104), vehicle 1A determines whether the received selection information is the selection information including the information indicating that the selection to use the predetermined function is made, or the selection information including the information indicating that the selection not to use the predetermined function is made (S105).

When vehicle 1A receives the selection information including the information indicating that the selection not to use the predetermined function is made (NO in S105), vehicle 1A sets the predetermined function to OFF (S106).

On the other hand, when vehicle 1A receives the selection information including the information indicating that the selection to use the predetermined function is made (YES in S105), vehicle 1A sets the predetermined function to ON (S107). It should be noted that, when the predetermined function is the timer charging function, vehicle 1A sets a start time of the timer charging. Specifically, when the selection information received from smartphone 5A includes information indicating a start time of the timer charging set by the user, vehicle 1A sets the start time set by the user, according to the selection information. When the selection information does not include the information indicating the start time of the timer charging, vehicle 1A sets a start time of the timer charging based on the result of learning. When the predetermined function is the charging upper limit function, vehicle 1A sets an upper limit SOC. Specifically, when the selection information received from smartphone 5A includes information indicating an upper limit SOC set by the user, vehicle 1A sets the upper limit SOC set by the user, according to the selection information. When the selection information does not include the information indicating the upper limit SOC, vehicle 1A sets an upper limit SOC based on the result of learning.

As described above, in charging setting system 100A in accordance with the second embodiment, vehicle 1A and smartphone 5A directly communicate with each other. Charging setting system 100A in accordance with the second embodiment can also exhibit the same effect as that of charging setting system 100 in accordance with the first embodiment.

It should be noted that the first and second variations described above can also be applied to charging setting system 100A in accordance with the second embodiment.

Third Embodiment

The first and second embodiments have described examples where vehicles 1 and 1A include the functions for the external charging. A third embodiment will describe an example where a vehicle 1B (FIG. 9) includes not only the functions for the external charging, but also functions for external power feeding and a virtual power plant (VPP) cooperation function. The third embodiment assumes a case where a vehicle 1B is used as an energy resource for implementing a VPP (hereinafter also referred to as a "demand side resource (DSR)") in a vehicle grid integration (VGI) system.

Figure 9:
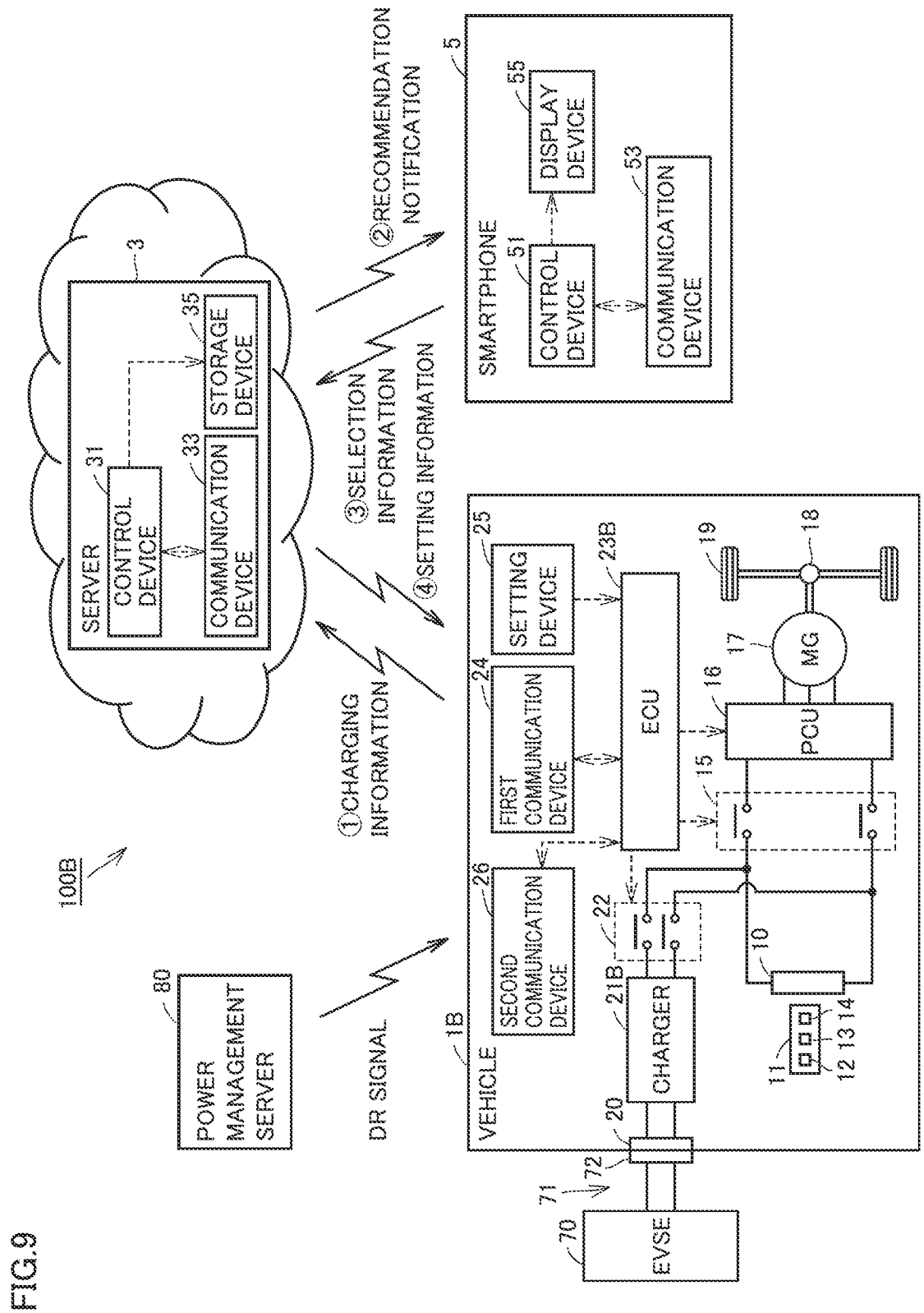
FIG. 9 is an overall configuration diagram of a charging setting system in accordance with a third embodiment.

FIG. 9 is an overall configuration diagram of a charging setting system 100B in accordance with the third embodiment. Referring to FIG. 9, charging setting system 100B includes vehicle 1B, server 3, and smartphone 5. Server 3 and smartphone 5 have basically the same configurations as those of server 3 and smartphone 5 described in the first embodiment.

In addition to the external charging, vehicle 1B enables external power feeding that feeds power of battery 10 to EVSE 70. Vehicle 1B is obtained by changing charger 21 and ECU 23 of vehicle 1 in accordance with the first embodiment to a charger 21B and an ECU 23B, respectively, and further adding a second communication device 26. Since the other components are the same as those of vehicle 1, the description thereof will not be repeated.

Second communication device 26 can communicate with a power management server 80. Power management server 80 manages system power by combining many DSRs and performing remote and integrated control thereon, using energy management technology utilizing the Internet of Things (IoT). Power management server 80 transmits, to vehicle 1B, a demand response signal that requests increase of power demand (a DR increase signal) and a demand response signal that requests suppression of power demand (a DR suppression signal).

Charger 21B is electrically connected between inlet 20 and battery 10. During the external charging, charger 21B converts AC power inputted to inlet 20 into DC power for charging battery 10. The power converted by charger 21B is supplied to battery 10, and battery 10 is charged. In addition, in the external power feeding, charger 21B converts the DC power of battery 10 into predetermined AC power. The power converted by charger 21B is supplied to EVSE 70.

ECU 23 has a power feeding upper limit function, for example, as the functions for the external power feeding. The power feeding upper limit function is a function of setting an upper limit of a power feeding amount of battery 10 in the external power feeding. The power feeding upper limit function can set an upper limit value of the power feeding amount, or can set a lower limit SOC, for example. The third embodiment will describe an example where a lower limit SOC is set when the power feeding upper limit function is used. For example, when the lower limit SOC is set to an SOC of 20%, the external power feeding ends when the SOC of battery 10 reaches 20%.

Further, ECU 23B has the VPP cooperation function. When the VPP cooperation function is set to ON, ECU 23B controls each component of the vehicle to perform the external charging or the external power feeding according to a DR signal. Specifically, when a DR increase signal that requests increase of power demand is received, ECU 23B performs the external charging to contribute to adjustment of supply and demand in a power grid. When a DR suppression signal that requests suppression of power demand is received, ECU 23B performs the external power feeding to contribute to adjustment of supply and demand in the power grid. When the VPP cooperation function is set to OFF, ECU 23B does not perform the external charging and the external power feeding even though a DR signal is received.

The functions for the external power feeding and the VPP cooperation function can be set through an operation on setting device 25, as with the functions for the external charging.

ECU 23B controls first communication device 24 to transmit charging information to server 3 at a predetermined cycle. The charging information includes information indicating a charging log, usage history information of the functions for the external charging, usage history information of the functions for the external power feeding, usage history information of the VPP cooperation function, information indicating the setting statuses of the functions for the external charging, information indicating the setting statuses of the functions for the external power feeding, information indicating the setting status of the VPP cooperation function, information about the state of deterioration of battery 10, and the like, for example.

ECU 23B also transmits the charging information to server 3 when it senses that charging connector 72 is connected to inlet 20. When ECU 23B senses that charging connector 72 is connected to inlet 20, ECU 23B further includes information on whether or not it includes a function of feeding power external to the vehicle, and information indicating whether or not connected EVSE 70 includes a function of feeding power to the system, in the charging information. It should be noted that ECU 23B can obtain the information indicating whether or not EVSE 70 includes the function of feeding power to the system, from EVSE 70, when charging connector 72 is connected to inlet 20.

Further, when a DR signal (a DR increase signal or a DR suppression signal) is received from power management server 80, ECU 23B includes information indicating that the DR signal is received, in the charging information.

Control device 31 of server 3 obtains the charging information from vehicle 1B via communication device 33. When control device 31 obtains the charging information, control device 31 determines whether or not there is a predetermined function with a frequency of use of less than or equal to a predetermined frequency (i.e., which is less frequently used) among the functions for the external power feeding, in the same manner as that for the determination on the functions for the external charging. Further, when control device 31 obtains the charging information, control device 31 determines whether or not the VPP cooperation function corresponds to the predetermined function. Specifically, control device 31 determines whether or not there is a predetermined function among the functions for the external power feeding, based on the conditions (1) and (2) described above for determining whether or not there is a predetermined function among the functions for the external charging. Further, control device 31 determines whether or not the VPP cooperation function corresponds to the predetermined function, based on "whether or not there is a history that the VPP cooperation function has been used in the past". Specifically, when there is a history that the VPP cooperation function has been used in the past, control device 31 determines that the VPP cooperation function is not the predetermined function. When there is no history that the VPP cooperation function has been used in the past, control device 31 determines that the VPP cooperation function is the predetermined function.

Control device 31 transmits a recommendation notification (a notification about the predetermined function) to smartphone 5, as in the first embodiment. Thereby, the user can recognize how to use the functions for the external charging, the functions for the external power feeding, and the VPP cooperation function, the presence thereof, or the like.

Processing Performed in Charging Setting System

FIG. 10 is a flowchart showing a procedure for processing performed in charging setting system 100B. When vehicle 1B senses that charging connector 72 is connected to inlet 20, vehicle 1B starts the processing. Vehicle 1B includes connection information indicating that charging connector 72 is connected to inlet 20 in charging information, and transmits the charging information to server 3 (S60).

When server 3 receives the charging information including the connection information, server 3 determines whether or not there is a predetermined function which is less frequently used, among the functions for the external charging, the functions for the external power feeding, and the VPP cooperation function (S70). When there is no predetermined function (NO in S70), server 3 blanks out information to be included in setting information, for example, and advances the processing to S80.

When there is a predetermined function (YES in S70), server 3 determines whether or not the predetermined function is set to ON in vehicle 1B, based on the charging information received from vehicle 1B (S71). When the predetermined function is set to ON (YES in S71), it is expected that the predetermined function may be used this time as charging connector 72 is connected to inlet 20, and thus server 3 advances the processing to S80 without transmitting a recommendation notification to the user. In this case, server 3 blanks out the information to be included in the setting information, for example.

On the other hand, when the predetermined function is set to OFF (NO in S71), server 3 advances the processing to S72. S72 is performed in a case where the predetermined function is a function for the external power feeding or the VPP cooperation function. Further, subsequent S73 and S74 are performed in the case where the predetermined function is the VPP cooperation function. That is, in the case where the predetermined function is a function for the external charging, server 3 skips the processing from S72 to S74. Further, in the case where the predetermined function is a function for the external power feeding, server 3 performs the processing in S72 but skips the processing in S73 and S74. Further, in the case where the predetermined function is the VPP cooperation function, server 3 performs the processing from S72 to S74.

In S72, server 3 determines whether or not vehicle 1B is a vehicle that enables the external power feeding, based on the charging information (S72). Further, server 3 determines whether or not EVSE 70 is a facility that can feed power to the system, based on the charging information (S72). When vehicle 1B is not a vehicle that enables the external power feeding, or when EVSE 70 is not a facility that can feed power to the system (NO in S72), server 3 advances the processing to S80 without transmitting a recommendation notification. In this case, server 3 blanks out the information to be included in the setting information, for example.

In the case where the predetermined function is a function for the external charging, when vehicle 1 is a vehicle that enables the external power feeding and EVSE 70 is a facility that can feed power to the system (YES in S72), server 3 advances the processing to S75 to transmit a recommendation notification (S75).

In the case where the predetermined function is the VPP cooperation function, when vehicle 1 is a vehicle that enables the external power feeding and EVSE 70 is a facility that can feed power to the system (YES in S72), server 3 advances the processing to S73. Server 3 determines whether or not a power request is generated, based on the charging information (S73). Specifically, when the charging information includes a DR signal, server 3 determines that a power request is generated, and when the charging information does not include a DR signal, server 3 determines that a power request is not generated.

When a power request is not generated (NO in S73), server 3 advances the processing to S80 without transmitting a recommendation notification. In this case, server 3 blanks out the information to be included in the setting information, for example.

When a power request is generated (YES in S73), server 3 determines whether or not vehicle 1B can accommodate the power request (S74). Specifically, when increase of power demand is requested, server 3 determines whether or not it is possible to charge vehicle-mounted battery 10, based on the charging information. When it is possible to charge battery 10, server 3 determines that the vehicle can accommodate the power request, and when it is not possible to charge battery 10, server 3 determines that the vehicle cannot accommodate the power request. For example, in a case where battery 10 is fully charged, or the SOC of battery 10 is close to a fully charged state, or the SOC reaches the upper limit SOC when the charging upper limit function is set, server 3 determines that it is not possible to charge battery 10. Further, when suppression of power demand is requested, server 3 determines whether or not it is possible to feed power from vehicle-mounted battery 10 to EVSE 70, based on the charging information. When it is possible to feed power from battery 10 to EVSE 70, server 3 determines that the vehicle can accommodate the power request, and when it is not possible to feed power from battery 10 to EVSE 70, server 3 determines that the vehicle cannot accommodate the power request. For example, in a case where the SOC of battery 10 is 0%, or the SOC of the battery 10 is close to 0%, or the SOC is less than or equal to the lower limit SOC when the power feeding upper limit function is set, server 3 determines that it is not possible to feed power from battery 10.

When server 3 determines that vehicle 1B cannot accommodate the power request (NO in S74), server 3 advances the processing to S80 without transmitting a recommendation notification. When server 3 determines that vehicle 1B can accommodate the power request (YES in S74), server 3 advances the processing to S75 to transmit a recommendation notification (S75).

When smartphone 5 receives the recommendation notification, smartphone 5 displays the contents of the recommendation notification (a recommendation screen) (S90). Smartphone 5 transmits selection information in response to an operation of the user on the recommendation screen to server 3 (S92). Specifically, when a selection to use the predetermined function is made, smartphone 5 includes information indicating that the selection to use the predetermined function is made, in the selection information. When a selection not to use the predetermined function is made, smartphone 5 includes information indicating that the selection not to use the predetermined function is made, in the selection information.

Server 3 waits until it receives the selection information (NO in S76). When server 3 receives the selection information (YES in S76), server 3 determines whether the received selection information is the selection information including the information indicating that the selection to use the predetermined function is made, or the selection information including the information indicating that the selection not to use the predetermined function is made (S77).

When the selection information includes the information indicating that the selection not to use the predetermined function is made (NO in S77), server 3 generates setting information indicating that the predetermined function is to be set to OFF (S78).

On the other hand, when the selection information includes the information indicating that the selection to use the predetermined function is made (YES in S77), server 3 generates setting information indicating that the predetermined function is to be set to ON (S79). Server 3 transmits the generated setting information to vehicle 1B (S80).

When vehicle 1B receives the setting information from server 3, vehicle 1B performs a setting for the predetermined function according to the setting information (S62). When the setting information includes the information indicating that the predetermined function is to be set to OFF, vehicle 1B sets the predetermined function to OFF. When the setting information includes the setting information indicating that the predetermined function is to be set to ON, vehicle 1B sets the predetermined function to ON.

As described above, in charging setting system 100B in accordance with the third embodiment, when there is a predetermined function which is less frequently used among the functions for the external power feeding and the VPP cooperation function, in addition to the functions for the external charging, a recommendation notification is transmitted from server 3 to smartphone 5. Thereby, the user can recognize how to use the predetermined function, the presence thereof, or the like. Accordingly, utilization of the functions for the external charging, the functions for the external power feeding, and the VPP cooperation function included in vehicle 1B can be promoted.

It should be noted that the first and second variations described above can also be applied to charging setting system 100B in accordance with the third embodiment. Further, it is also possible to incorporate, into charging setting system 100B, a configuration in which vehicle 1B and smartphone 5 directly communicate with each other, as in the second embodiment described above.

Although the embodiments of the present disclosure have been described, it should be understood that the embodiments disclosed herein are illustrative and non-restrictive in every respect. The scope of the present disclosure is defined by the scope of the claims, and is intended to include any modifications within the scope and meaning equivalent to the scope of the claims.

What is claimed is:

1. An information notification device comprising:
   a communication device that can communicate with a terminal device owned by a user of a vehicle that enables external charging; and
   a control device that controls the communication device, when there is a predetermined function among functions for the external charging, to notify the terminal device of information about the predetermined function, the predetermined function having a frequency of use of less than or equal to a predetermined frequency, the functions for the external charging being included in the vehicle, wherein
   when there is a function for which a number of times of the external charging in which the function has not been used reaches a predetermined number of times, or when there is a function which is not used for a period exceeding a predetermined period, the control device determines that the frequency of use of the function is less than or equal to the predetermined frequency, and
   the functions for the external charging include a timer charging function, the timer charging function being a function of starting the external charging when a preset start time is reached, or a function of completing the external charging at a preset end time.

2. The information notification device according to claim 1, wherein the information includes information to promote utilization of the predetermined function, and when the control device receives a notification indicating that a selection to use the predetermined function is made, the control device makes a setting to activate the predetermined function.

3. The information notification device according to claim 1, wherein the functions for the external charging include a charging upper limit function of setting an upper limit of a charging amount in the external charging.

4. The information notification device according to claim 1, wherein
   the vehicle enables external power feeding that feeds power to a power source external to the vehicle, and
   the control device controls the communication device to notify the terminal device of information about the predetermined function when the predetermined function is included in functions for the external power feeding, the functions being included in the vehicle.

5. The information notification device according to claim 4, wherein
   the vehicle can cooperate with a server that manages a power system including the power source, and when the vehicle cooperates with the server, the vehicle performs the external charging upon receiving a charging request from the server and performs the external power feeding upon receiving a power feeding request from the server, and when a function which is included in the vehicle and cooperates with the server is the predetermined function, the control device controls the communication device to notify the terminal device of information about the function which cooperates with the server.

6. A vehicle comprising the information notification device according to claim 1.

7. An information notification system comprising:
a terminal device owned by a user of a vehicle that enables external charging; and
an information notification device that can communicate with the terminal device, wherein
when there is a predetermined function among functions for the external charging, the information notification device notifies the terminal device of information about the predetermined function, the predetermined function having a frequency of use of less than or equal to a predetermined frequency, the functions for the external charging being included in the vehicle, wherein
when there is a function for which a number of times of the external charging in which the function has not been used reaches a predetermined number of times, or when there is a function which is not used for a period exceeding a predetermined period, the information notification device determines that the frequency of use of the function is less than or equal to the predetermined frequency, and
the functions for the external charging include a timer charging function, the timer charging function being a function of starting the external charging when a preset start time is reached, or a function of completing the external charging at a preset end time.

8. The information notification system according to claim 7, wherein
the information includes information to promote utilization of the predetermined function,
the terminal device receives a user operation to select whether or not to use the predetermined function, and
when the information notification device receives, from the terminal device, a notification indicating that a selection to use the predetermined function is made, the information notification device makes a setting to activate the predetermined function.

9. An information notification method comprising:
determining whether or not there is a predetermined function among functions for external charging, the predetermined function having a frequency of use of less than or equal to a predetermined frequency, the functions for the external charging being included in a vehicle that enables the external charging; and
notifying a terminal device owned by a user of the vehicle of information about the predetermined function when the predetermined function is included in the functions for the external charging, wherein
when there is a function for which a number of times of the external charging in which the function has not been used reaches a predetermined number of times, or when there is a function which is not used for a period exceeding a predetermined period, determining that the frequency of use of the function is less than or equal to the predetermined frequency, and
the functions for the external charging include a timer charging function, the timer charging function being a function of starting the external charging when a preset start time is reached, or a function of completing the external charging at a preset end time.

10. The information notification method according to claim 9, wherein
the information includes information to promote utilization of the predetermined function, and
the information notification method further comprises:
receiving, by the terminal device, a user operation to select whether or not to use the predetermined function; and
making a setting to activate the predetermined function upon receiving, from the terminal device, a notification indicating that a selection to use the predetermined function is made.

* * * * *